(No Model.)
J. SHINN
HAMMOCK.
No. 500,692. Patented July 4, 1893.
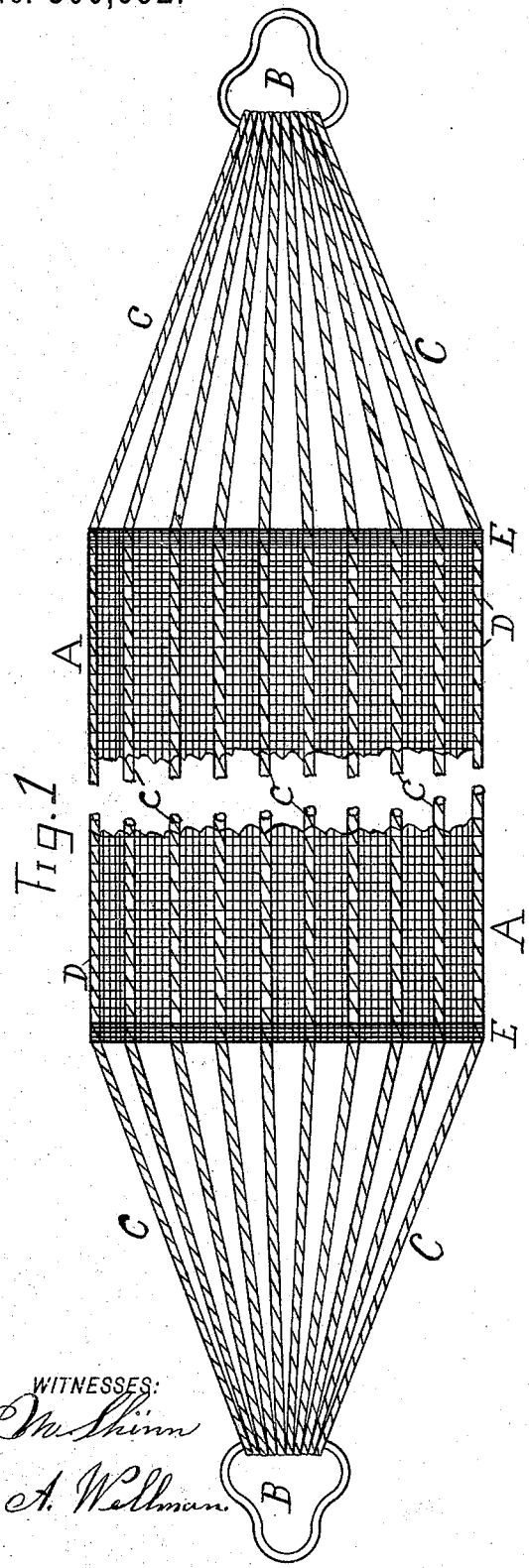
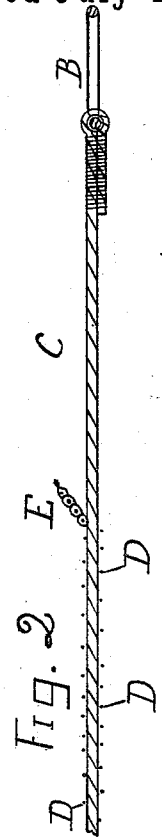
WITNESSES:
H. M. Shinn
M. A. Wellman
INVENTOR
John Shinn.

UNITED STATES PATENT OFFICE.

JOHN SHINN, OF PHILADELPHIA, PENNSYLVANIA.

HAMMOCK.

SPECIFICATION forming part of Letters Patent No. 500,692, dated July 4, 1893.

Application filed November 18, 1892. Serial No. 452,382. (No model.)

*To all whom it may concern:*

Be it known that I, JOHN SHINN, a citizen of the United States, residing at Philadelphia, in the county of Philadelphia and State of Pennsylvania, have invented a new and useful Improvement in Woven Hammocks, of which the following is a specification.

My invention relates to hammocks, that have a woven body, or bed.

The object of my improvement is to produce by weaving, a hammock of improved construction, in which the suspension cords, are so woven into the bed, that the suspension cords will receive all, or most all the weight and strain; the yarn forming the other part of the bed, sustains but little or any of the weight placed on the bed. For the body of the bed I am enabled to use lighter and fine yarn. If desired I can use for weft, "chenille," plain, colored or variegated. The suspension cords I weave into, and they run the full length of the bed. The ends are connected to suspension rings, as is illustrated in the accompanying drawings making a part of this specification, in which—

Figure 1 is a plan view of a hammock illustrating my invention. Fig. 2 is a section parallel with the suspension cords.

Similar letters of reference refer to like parts in both views.

Previous to my invention the suspension cords have been connected by loops to unwoven portions of all the warp threads, or a hem has been made at each end of the bed, and the cords connected to the hem.

In my invention, I weave the suspension cords into the body of the bed A, and they run the full length of the bed, extending to, and connecting the suspension rings B.

My improved hammock can be woven in looms of ordinary construction, operating three heddles, one for the cords C, and two for the fine body warp yarn. The fine warp threads are all wound on one beam, the suspension cords, wound on another, or the cords C, may be drawn from spools or balls. The fine warp threads work one "shot" up, and one down, plain weave. The cords C, being all in one heddle, and operate one up, and one down, the cords lay between the weft threads D, ("stuffers.") The heddle carrying the cords C, are so arranged that they may be disconnected and remain stationary, up, or down, when weaving the hem E. This hem is woven of a length as will make a hem for end of the bed last woven, and a hem for the next bed to be woven. The web for the two hems are then cut from selvage to selvage. The cords C, are then drawn off the beam or spools, of a length as will make the suspension cords for the bed last woven, and the beginning end of the next bed to be woven. The woven hem is then by any suitable means fastened to the cords C. The cords C, are then connected to the take-up, and the weaving of the bed resumed.

The woven hammock when taken from the loom, has the hems E, turned over, and sewed fast to the bed and cords C. The cords are connected to the suspension rings B, in any suitable manner.

It will be noticed that when the hammock is taken from the loom, to finish the same, the hems at the ends are sewed down, the cords connected to the suspension rings, and the hammock is finished.

By my improved manner of interweaving the suspension cords into the bed of the hammock, all the strain comes on the cords, and the body of the bed may be made of fine yarn. It may be woven open, or close, and may be plain, or cross woven. If desired chenille weft can be used, about twelve (more or less) shots per inch, which will cover the body warp and suspension cords. The chenille weft threads may be variegated in color, and when "set" make a figure such as in chenille curtains and "Smyrna" rugs.

It is obvious that my improved bed may be applied to hammock chairs, by connecting the cords C, to the bed-suspending part of the chair, or the ends of the cords C, may be connected together after passing over the bed suspending part of the chair.

Having as above fully described my invention, what I claim as new, and desire to secure by Letters Patent, is—

A woven hammock, consisting of a body warp and weft, in combination with a series of interwoven cords, for suspension, substantially as shown and described.

JOHN SHINN.

Witnesses:
W. M. SHINN,
M. A. WELLMAN.